Figure 1:
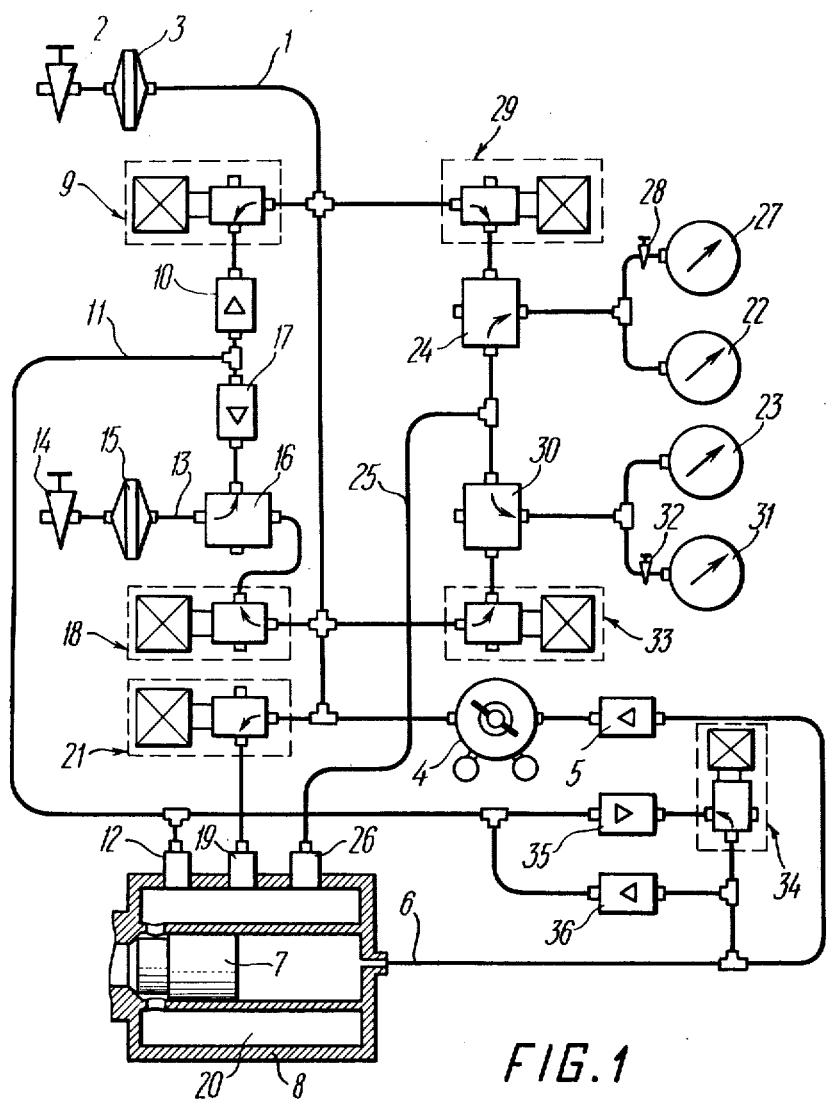

United States Patent [19]
Kononenko et al.

[11] 3,891,380
[45] June 24, 1975

[54] FUEL-FEED SYSTEM OF COMBUSTION CHAMBER IN AN IMPULSE-EFFECT MACHINE FOR PLASTIC METAL WORKING

[76] Inventors: Vadim Grigorievich Kononenko, ulitsa Chkalova, 15, kv. 12; Vitaly Evgenievich Strizhenko, ulitsa Osnovyanskaya, 56; Stanislav Anisimovich Maznichenko, Saltovsky Massiv, 521 mikroraion, 68, kv. 188; Vladimir Nikolaevich Sarancha, ulitsa Kosmonavtov, 7a, kv. 71; Viktor Alexeevich Stelmakh, ulitsa Kirova, 18, kv. 2; Igor Pavlovich Komnatny, ulitsa Cheljuskintsev, 6, kv. 1; Serafim Vasilievich Schekochikhin, Pervaya Lesoparkovaya, 5, kv. 76; Viktor Vasilievich Bozhko, ulitsa Chkalova, 15, kv. 1; Nikolai Borisovich Ponomarenko, ulitsa Chkalova, 15, kv. 1; Valeria Mikhailovna Danilenko, ulitsa Lenina, 12, kv. 150; Sergei Vasilievich Yatsenko, Moskovsky prospekt, 204/1, kv. 36, all of Kharkov, U.S.S.R.

[22] Filed: Mar. 12, 1974

[21] Appl. No.: 450,495

[52] U.S. Cl. ............................................ 431/1; 60/39.6
[51] Int. Cl. ........................................................ F23c 3/02
[58] Field of Search ........................... 431/1; 60/39.6

[56] References Cited
UNITED STATES PATENTS
3,756,763   9/1973   Elmo et al. ........................... 431/1

*Primary Examiner*—Carroll B. Dority, Jr.
*Attorney, Agent, or Firm*—Eric H. Waters

[57] ABSTRACT

The fuel-feed system of the combustion chamber in an impulse-effect machine for plastic metal working incorporates a high pressure air line which communicates with the air side of the combustion chamber shut-off device and with the admission valve provided on the combustion chamber shell, as well as a low pressure gas line which communicates with said admission valve. Provided on the combustion chamber shell are a compression release valve to communicate the combustion chamber interior space with the atmosphere, said valve being communicated with the high pressure air line, and a pressure relief valve to communicate the combustion chamber interior space with either of the two meters, of which one is to measure combustible gas pressure and the other is to measure combustible mixture pressure inside the combustion chamber. The fuel-feed system according to the invention incorporates also a pipeline through which the admission valve communicates the combustion chamber interior space with the air side of the shut-off device.

2 Claims, 2 Drawing Figures

FUEL-FEED SYSTEM OF COMBUSTION CHAMBER IN AN IMPULSE-EFFECT MACHINE FOR PLASTIC METAL WORKING

The present invention relates to plastic metal working practice and has particular reference to fuel-feed systems of the combustion chamber in an impulse-effect machine for plastic metal working.

The present invention can find useful application in impulse-effect machines for plastic metal working in cutting hot metal on continuous steel-casting plants, in rolling practice, briquetting metal chip or powders, or three-dimensional pressworking. There is known a fuel-feed system of the combustion chamber in an impulse-effect machine for plastic metal working (cf. a symposium "On plastic metal working in mechanical engineering," issue 5, published in the USSR by Kharkov State University Press 1969 the article entitled "Circuits of gas-distribution organs and fuel-feed systems in impulse-effect metal working machines," by V. E. Strizhenko et al., FIG. 5 (in Russian).

In the known fuel-feed system the combustion chamber interior space is communicated with a low pressure gas line through an admission valve provided on the combustion chamber shell and through a non-return valve, said non-return valve being provided after a pneumoelectric valve with respect to the combustible gas flow. The pneumoelectric valve opens the low pressure gas line to fill the chamber with combustible gas.

The combustion chamber is communicated with a high pressure air line through said admission valve and said non-return valve, the latter being provided after the pneumoelectric valve with respect to the air stream flow. Provided on the combustion chamber shell is a compression release valve communicating the combustion chamber interior space with the atmosphere to scavenge the chamber of combustion residues. Besides, in case of emergency, it stops the process of feeding the combustible mixture and removes the latter from the combustion chamber. If there occurs an undue ingress of combustible gas or air from gas or air lines to the combustion chamber, the compression release valve precludes spontaneous operation of the impulse-effect machine during the interval between the working cycles. The compression release valve communicates with the high pressure air line through a pneumoelectric valve which feeds compressed air to keep the compression release valve closed during the working cycle, viz., during the process of filling the combustion chamber with combustible gas and compressed air, during the combustion process and during the working stroke of the impulse-effect machine.

To measure the pressure of the combustible mixture and the pressure of the combustible gas inside the combustion chamber, the latter is connected with meters, each meter being connected to the combustion chamber through an air-operated valve which is actuated by compressed air supplied from the high pressure air line through said pneumoelectric valve.

To protect the meters against the effects of high temperature and the pressure of combustion products, an adjustable spool-type pressure relief valve is provided on the combustion chamber shell, said valve being adapted to close when ignition of the combustible mixture takes place. The working space of the combustion chamber communicates with the meters through the pressure relief valve. A shut-off device is provided inside the combustion chamber, the air side of this device being in communication with the high pressure air line. Said shut-off device provides for tightness of the combustion chamber during the filling process and the combustion of the combustible mixture. However, this fuel-feed system of the impulse-effect machine combustion chamber fails to provide stable initial parameters of the combustible mixture due to the fact that the combustion chamber is not completely scavenged of combustion residues upon completion of the working cycle with the result that the charge ratio of the combustion chamber is reduced with resultant decrease in the efficiency of the impulse-effect machine.

In cases where the power output of the machine is to be changed in response to the temperature variation of the blank to be machined or during parts stamping, when the impact energy is to be varied within a wide range from impact to impact, i.e., when the initial pressure of the combustible mixture is changed, the amount of the combustion residues may vary from cycle to cycle. This results in a reduced stability of the initial parameters. Besides, the system described above fails to provide cooling of the combustion chamber, which results in premature failure of the shut-off device and the valves provided on the combustion chamber shell, and, consequently, in failure of the combustion chamber tightness, rendering the machine inoperative.

The known fuel-feed system of the impulse-effect machine combustion chamber fails to provide equal pressure in the combustion chamber and in the air space of the shut-off device, which is necessary to attain the maximum efficiency of the machine. This is attributed to the fact that when the combustible mixture feeding pressure in the combustion chamber exceeds the air pressure in the shut-off device, said device will open during the combustion before the combustion pressure reaches its maximum value determined by the chemical composition of the fuel. This brings about a sharp reduction of the energy of the impulse-effect machine and makes the normal performance of the necessary technological process impossible. If the combustible mixture feeding pressure in the combustion chamber is lower than that in the shut-off device, the shut off device will not open when the combustion mixture ignites, on which account the working cycle is missed. The entire energy of the burned fuel will be spent for heating the combustion chamber and the units thereof, thus causing its failure due to the fact that the combustion chamber components (for example, the shut-off device) contain sealing elements, such as rubber rings which are subject to damage from high temperature, necessitating replacement.

When regulating the power output of the impulse-effect machine, both the combustible mixture pressure inside the chamber and the pressure in the shut-off device should be controlled, which, in case of separate control, occurs to be difficult for the operator. This, in turn, adversely affects the efficiency of the operators and shortens the machine service life.

It is therefore an object of the present invention to attain stable initial parameters of a combustible mixture.

Another object of the invention is to improve the efficiency of an impulse-effect machine for plastic metal working.

It is also an object of this invention to provide an increase in the service life of the combustion chamber.

It is the last object of this invention to improve attendance conditions.

The present invention is primarily directed toward providing a fuel-feed system of the combustion chamber of an impulse-effect machine for plastic metal working, which will provide cooling of the combustion chamber by air-scavenging the latter with air blast whereby stable initial parameters are attained with the result that the efficiency of the impulse-effect machine increases, this adding to the service life of the combustion chamber.

The above-described and other objects are attained by that in a fuel-feed system of the combustion chamber of an impulse-effect machine for plastic metal working comprising a high-pressure air line communicated through a pressure governor and a non-return valve positioned in the direction of the air stream movement with the air side of a shut-off device of the combustion chamber and series connected (with respect to the direction of the air stream movement) through a pneumoelectric valve and a non-return valve to an admission valve provided on the shell of the combustion chamber, a low pressure gas line connected in series (with respect to the direction of the combustible gas flow) with said admission valve through an air-operated valve and a non-return valve, a compression release valve provided on the shell of the combustion chamber to communicate the interior space thereof with the atmosphere and communicated through a pneumoelectric valve with the high pressure air line, a meter to measure combustible gas pressure and a meter to measure combustible mixture pressure inside said interior space of said combustion chamber, each meter being connected to the interior space of the combustion chamber through a pressure relief valve provided on the shell of the combustion chamber and an air-operated valve actuated by compressed air supplied from the high pressure air line through a pneumoelectric valve, according to the invention, the combustion chamber interior space is communicated with the air side of the shut-off device through the admission valve.

Due to the provision of a fuel-feed system according to the invention the above-described objects are attained, viz., initial parameters are rendered stable by scavenging the combustion chamber of the combustion residues which results in improved charge ratio of the combustion chamber. Besides, the removal of the combustion residues makes the combustible mixture composition stable, this adding to the efficiency of the machine because in case of complete scavenging the same volume of the combustion chamber gives more power output due to an increased amount of the combustible mixture, at the same filling pressure.

The service life of the combustion chamber is increased due to reduced thermal stress on the parts thereof, for example, the shut-off device, when scavenging the combustion chamber. It is desirable that the admission valve of the combustion chamber be communicated with the air side of the shut-off device through a non-return valve located in the direction of the air stream issuing from said admission valve through another non-return valve positioned in the direction of the air stream flowing from said air side of said shut-off device, said valve being fitted in parallel with said first non-return valve, and through a pneumoelectric valve interconnected with said second non-return valve. This improves servicing conditions of the impulse-effect machine, precludes inappropriate operation of the machine resulting from the operator's errors on account of the fact that the pressure in the combustion chamber interior space and the pressure in the air space of the shut-off device is controlled automatically, thereby eliminating manual control.

Other objects and advantages of this invention will become apparent from the consideration of the following specification with reference to the accompanying drawings, wherein:

FIG. 1 schematically illustrates the fuel-feed system of the combustion chamber in an impulse-effect machine for plastic metal working, according to the invention.

Figure 2:
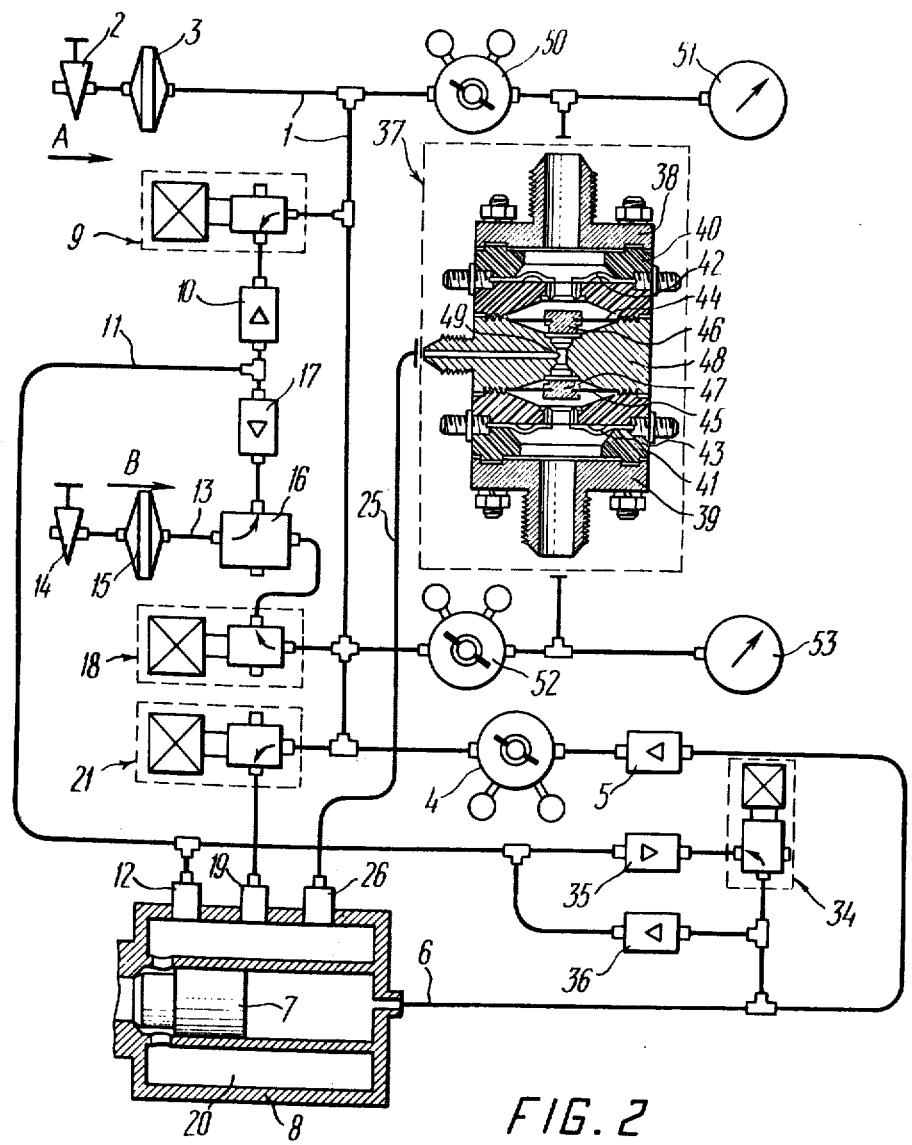

FIG. 2 illustrates an embodiment of the fuel-feed system of the combustion chamber in an impulse-effect machine for plastic metal working, according to the invention.

The fuel-feed system of the combustion chamber in an impulse-effect machine for plastic metal working comprises a high-pressure air line 1 (FIG. 1) provided with a valve 2 and a filter 3. Through the valve 2 the high pressure air line 1 communicates with a compressed air source (not shown in the drawing). The filter 3 is adapted to clean the air of solid particles. The high pressure air line 1 communicates, through a pressure governor 4, a non-return valve 5 located in the direction of the air stream and a pipeline 6, with the air side of a shut-off device 7 located inside the combustion chamber shell 8. The high pressure air line communicates, through a pneumoelectric valve 9 and a non-return valve 10 arranged in series with respect to the direction of the air stream flow and a pipeline 11, with an admission valve 12 provided on the combustion chamber shell 8. The fuel-feed system also comprises a low pressure gas line 13 provided with a valve 14 which communicates the low pressure gas line 13 with a gas source (not shown) and a filter 15 adapted to purify the gas of solid particles. The low pressure gas line 13 communicates through an air-operated valve 16 and a non-return valve 17 arranged in series with respect to the direction of the gas flow, and the pipeline 11, with the admission valve 12. The air-operated valve 16 is controlled by a pneumoelectric valve 18 which communicates with the high pressure air line 1. The fuel-feed system comprises a compression-release valve 19, provided on the combustion chamber shell 8. The valve 19 communicates the combustion chamber interior space 20 with the atmosphere to scavenge it of combustion residues and is controlled by pneumoelectric valve 21 communicating with the high pressure air line. In case of emergency the compression release valve 19 stops the process of filling the combustion chamber interior space 20 with the combustible mixture and removes the latter therefrom. In case there occur leaks from the high pressure air line 1 or the low pressure gas line 13 into the combustion chamber interior space 20 in the interval between the working cycles, the valve 19 precludes spontaneous operation of the impulse-effect machine. In addition, the fuel-feed system comprises a meter, say, an electric-contact pressure gauge 22 to measure combustible gas pressure in the combustion chamber interior space 20 and a meter, e.g., electric-contact pressure gauge 23 to measure combustible mixture pressure in the combustion chamber interior space 20. During the process of filling the combustion chamber interior space 20 with the combustible gas the pressure gauge 22 is kept in communication through an air-operated valve 24 and a pipeline 25 with a pressure-relief valve 26 provided on the combustion chamber shell 8 and adapted to connect the combustion chamber interior space 20 to the pressure gauge 22. Fitted in parallel with said electric-contact pressure gauge 22 is a master pressure gauge 27, which serves to verify the latter. The pressure gauges 27 and 22 are interconnected through a valve 28. The air-operated valve 24 is controlled by a pneumoelectric valve 29 communicating with the high pressure air line 1. During the process of filling the combustion chamber interior space 20 with air, the pressure gauge 23 is kept in communication through an air-operated valve 30 and the pipeline 25 with the pressure relief valve 26, the latter connecting the combustion chamber interior space 20 to the pressure gauge 23. Fitted in parallel with the electric-contact pressure gauge 23 is a master pressure gauge 31, which serves to verify the electric-contact pressure gauge 23. The pressure gauge 23 and the pressure gauge 31 are interconnected through a valve 32. The air-operated valve 30 is controlled by a pneumoelectric valve 33 communicating with the high pressure air line 1. The pressure-relief valve 26 is adapted to protect the pipeline 25, the air-operated valve 24 and the air-operated valve 30, and the pressure gauges 22, 23, 27, 31 against the effects of high temperature and the pressure of combustion products. The air side of the shut-off device 7 communicates with the combustion chamber interior space 20 through the pipeline 6, a pneumoelectric valve 34, a non-return valve 35 and the admission valve 12, the pneumoelectric valve 34 and the non-return valve 35 being arranged in series in the direction of the air stream flowing from said air side of said shut-off device 7. Fitted in parallel with the pneumoelectric valve 34 and the non-return valve 35 and in the direction of the air stream passing from the admission valve 12 is a non-return valve 36 communicating the pipeline 11 with the air side of the shut-off device 7. The pneumoelectric valves 9, 18, 21, 29, 33 and 34 are controlled by an automatic control system (not shown in the drawing).

The fuel-feed system of the combustion chamber in an impulse-effect machine for plastic metal working operates as follows.

Opening the valve 2 (FIG. 1) permits compressed air to flow through the filter 3 to the high pressure air line 1. From the high pressure air line 1 the compressed air flows to the pneumoelectric valves 9, 29, 18, 33 and 21, said valves being in the closed position, and to the pressure governor 4. The pressure governor 4, being adjusted to a preset pressure which is somewhat lower than the working pressure of filling the combustion chamber interior space 20, passes the compressed air through the non-return valve 5 into the air side of the shut-off device 7. Opening the valve 14 permits the gas to flow through the filter 15 to the air-operated valve 16. The automatic control system (not shown) simultaneously puts pneumoelectric valves 21, 18 and 33 in operation. This done, the compressed air flows from the high pressure air line 1 through the valve 21 to the compression release valve 19 which cuts off the combustion chamber interior space 20 from the atmosphere.

Compressed air through the valve 18 comes to the air-operated valve 16 which opens to admit the combustible gas to the valve 17; the latter lets the air pass to the admission valve 12 whereupon the gas enters the combustion chamber interior space 20. Since the compressed air pressure after the check valve 36 is preset to be higher than that of the gas, and the non-return valve 35 is positioned against the direction of the gas flow, the gas cannot pass through the non-return valves 35 and 36 to the air side of the shut-off device.

The compressed air acting on the pneumoelectric valve 29 opens the air-operated valve 24, the gas passing from the combustion chamber interior space 20 to the electric-contact pressure gauge 22. To check the accuracy of measurements of the electric-contact pressure gauge 22 the master pressure gauge 27 is cut in by opening the valve 28, said pressure gauge 27 not operating usually, being used only to periodically verify the electric-contact pressure gauge 22 (say, once a week).

Upon reaching the preset pressure in the combustion chamber interior space 20 the electric-contact pressure gauge 22, actuated by the automatic control system, (not shown in the drawings) closes the pneumoelectric valves 18, 29 and opens the pneumoelectric valves 33 and 9. The pneumoelectric valve 21 controlling the compression release valve 19 remains in circuit. The air-operated valves 16 and 24 become closed, and the gas flowing from the electric-contact pressure gauge 22 through the air-operated valve 24 escapes to the atmosphere with the result that the pointer of the pressure gauge 22 returns to its initial position. By closing the air-operated valve 16 the fuel feed of the combustion chamber interior space 20 is discontinued.

The pneumoelectric valve 9, which is in the open position, permits the compressed air to pass through the non-return valve 10 and the admission valve 12 into the combustion chamber interior space 20 wherein it mixes with gas. Through the same valve 9 and the non-return valve 10 the air flows to the non-return valve 36 and, at a pressure somewhat higher than that set by the governor 4, passes through the non-return valve 36 to the air side of the shut-off device 7, i.e., the pressures on the air side of the shut-off device and in the combustion chamber interior space 20, become equalized, the pressures therein being kept equal till the filling of the combustion chamber interior space 20 is completed.

The air-gas mixture flows from the combustion chamber interior space 20 through the air-operated valve 30 actuated by the pneumoelectric valve 33 and through the pressure-relief valve 26 to the electric-contact pressure gauge 23. Connected in parallel with the latter in a way similar to that described hereinabove is the master pressure gauge 31.

Once the preset value of the filling pressure in the combustion chamber interior space 20 has been reached the electric-contact pressure gauge 23 through the agency of the automatic control system (not shown) closes the pneumoelectric valves 33 and 9. As a result, the supply of compressed air into the combustion chamber interior space 20 is discontinued, the air-operated valve 30 becomes closed to disconnect the pressure gauges 23 and 31 from the combustion chamber interior space 20, thus bringing them in communication with the atmosphere similarly to the way described above.

This done, the combustible mixture is ignited in the combustion chamber interior space 20, the admission valve 12 being closed, the compression release valve 19 also being closed, whereas the pressure relief valve 26 gets closed automatically under the action of the rising pressure of the combustion products. In due time the shut-off device 7 opens the combustion chamber interior space 20 and the combustion products are delivered therefrom to the working member of the impulse-effect machine to start the working cycle.

Some time after the operating cycle is completed, the pneumoelectric valve 21 cuts off to open the compression release valve 19 communicating the combustion chamber interior space 20 with the atmosphere. Simultaneously, the pneumoelectric valve 34 opens to establish communication between the air-side of the shut-off device 7 and the admission valve 12. As a result the compressed air makes its way from the air side of the shut-off device 7 through the pneumoelectric valve 34, the non-return valve 35 and the admission valve 12 into the combustion chamber interior space 20 to cool it and to expell therefrom remaining combustion residues through the compression release valve 19 to the atmosphere. This process lasts some time, whereupon the pneumoelectric valve 34 cuts out. Now the fuel-feed system is ready to perform another operating cycle.

In another embodiment of the fuel-feed system of the combustion chamber of the impulse-effect machine for plastic metal working the pipeline 25 communicates the combustion chamber interior space 20 through the pressure-relief valve 26 with a pressure pickup 37 (FIG. 2), say, of a diaphragm-operated type, which delivers a signal to the automatic control system when a definite gas pressure, and, subsequently a definite combustible mixture pressure are attained in the combustion chamber interior space 20. The pressure pickup 37 incorporates two covers 38 and 39 with two dielectric housing 40 and 41 interposed therebetween, each housing being provided with spring contacts 42 and 43 tightly secured thereto. A diaphragm 44 adjoins the housing 40 while a diaphragm 45 adjoins the housing 41. The diaphragm 44 has a flat contact 46 in the centre thereof, while the diaphragm 45 is equipped with a flat contact 47. Located between the diaphragm 44 and the diaphragm 45 is the housing 48 of the pressure pickup 37. In interior space of the housing 48 provision is made of a passageway 49 communicating with the pipeline 25. Supplied to the diaphragm 44, more particularly to the side thereof facing the cover 38, is compressed air coming from the high-pressure air line 1 through a pressure governor 50, the compressed air pressure being measured by a pressure gauge 51. Supplied to the diaphragm 45, more particularly to the side thereof facing the cover 39, is compressed air coming from the high pressure air line 1 through a pressure governor 52, the compressed air pressure being measured by a pressure gauge 53.

The fuel-feed system of the combustion chamber in the impulse-effect machine for plastic metal working operates as follows.

The pressure governor 50 controls the compressed air pressure indicated by the pressure gauge 51, said pressure being applied to the diaphragm 44 and being equal to the gas pressure when filling the combustion chamber interior space 20. Pressure governor 52 controls the compressed air pressure indicated by the pressure gauge 53 which is applied to the diaphragm 45, said pressure being equal to the combustible mixture pressure when filling the combustion chamber interior space 20 with compressed air. Under the action of the compressed air the diaphragms 44 and 45 are pressed against the housing 48. During the process of filling the combustion chamber interior space 20 with gas the following stages take place. The gas flows through the pressure-relief valve 26 and the pipeline 25 to the passageway 49, wherefrom it goes to the diaphragm 44 and the diaphragm 45. Once the pressure preset by the pressure governor 50 is reached, the diaphragm 44 is pressed against the dielectric housing 40 with the result that the flat contact 46 makes the contacts 42 close, the latter delivering a signal to the automatic control system (not shown in the drawing). The automatic control system disconnects the valve 18 to stop the process of filling the combustion chamber interior space 20 with combustible gas and to open the valve 9 which feeds the interior space 20 with compressed air.

During the process of feeding the combustion chamber interior space 20 the following stages take place. The gas-air mixture travels through the pressure-relief valve 26 and the pipeline 25 to the passageway 49, whereupon it flows to the diaphragm 44 and the diaphragm 45. When the pressure preset by the pressure governor 52 is reached, the diaphragm 45 is pressed against the dielectric housing 41, the flat contact 47 closing the contacts 43 which send a signal to the automatic control system (not shown in the drawing). Said system disconnects the valve 9, which stops the process of filling the combustion chamber interior space 20 with air, and switches on the combustion chamber ignition system (not shown in the drawing) to ignite the combustible mixture. Then the fuel-feed system of the combustion chamber in the impulse-effect machine operates in the same way as described above. It is recommendable to use the pressure pickup 37 in the fuel feed system of the combustion chamber of the impulse-effect machines for plastic metal working operating at high cycle rate.

What we claim is:

1. A fuel-feed system of the combustion chamber in an impulse-effect machine for plastic metal working, comprising in combination the following components: a high pressure air line (1); a shut-off device (7) of said combustion chamber; a pressure governor (4); a non-return valve (5) positioned in the direction of the air stream flow; a pneumoelectric valve (9); a non-return valve (10); an admission valve (12) provided on a shell (8) of said combustion chamber; said high pressure air line (1) communicating through said pressure governor (4) and said non-return valve (5) with the air side of said shut-off device (7) and being series-connected (with respect to the direction of the air stream flow) to said admission valve (12) through said pneumoelectric valve (9) and said non-return valve (10); a low pressure gas line (13); an air-operated valve (16); a non-return valve (17); said low pressure gas line (13) being communicated in series (with respect to the direction of the combustible gas flow) with said admission valve (12) through said air-operated valve (16) and said non-return valve (17); a compression release valve (19) provided on the shell (8) of said combustion chamber to communicate the interior space (20) thereof with the atmosphere; a pneumoelectric valve (21) to communicate said compression release valve (19) with said high pressure air line (1); a pressure relief valve (26), provided on the shell (8) of said combustion chamber; a pneumoelectric valve (29); an air-operated valve (24) controlled by compressed air from said high pressure air line (1) through said pneumoelectric valve (29); a meter (22) to measure combustible gas pressure inside the interior space (20) of said combustion chamber, said meter being connected, through said pressure relief valve (26) and said air-operated valve (24) to said interior space (20) of said combustion chamber; a pneumoelectric valve (33); an air-operated valve (30) controlled by compressed air from said high pressure air line (1) through said pneumoelectric valve (33); a meter (23) to measure combustible mixture pressure inside said interior space (20) of said combustion chamber, said meter being connected through said pressure relief valve (26) and said air-operated valve (30) to said interior space (20) of said combustion chamber; a pipeline (6) communicating, through said admission valve (12), said interior space (20) of said combustion chamber with said air side of said shut-off device.

2. A fuel-feed system as claimed in claim 1 wherein provision is made of a non-return valve (36) positioned in the direction of the air stream coming from said admission valve (12), and adapted to communicate said admission valve (12) of said combustion chamber with said air side of said shut-off device (7); a pneumoelectric valve (34); another non-return valve (35) positioned in the direction of the air stream flowing from said air side of said shut-off device (7), said valve being incorporated in parallel with said non-return valve (36) and interconnected thereto through said pneumoelectric valve (34) to communicate said admission valve (12) of said combustion chamber with said air side of said shut-off device (7).

* * * * *